United States Patent Office 2,826,563
Patented Mar. 11, 1958

2,826,563

POLYMER COMPOSITIONS AND IMPROVED PROCESS FOR VULCANIZATION OF VINYL-PYRIDINE RUBBER WITH ALKYL SULFENYL DITHIOCARBAMATES

Joseph F. Svetlik, Phillips, Tex., assignor to Phillips Petroleum Company, a corporation of Delaware No Drawing. Application June 29, 1953
Serial No. 364,933

20 Claims. (Cl. 260—79.5)

This invention relates to synthetic rubber copolymers. In one aspect it relates to a method of stabilizing a vinylpyridine copolymer and to the stabilized copolymer. In another aspect it relates to a method for decreasing the scorch tendency of a vinylpyridine rubber composition. In still another aspect it relates to vulcanization acceleration, without premature vulcanization, in a vinylpyridine copolymer by the incorporation therein of a compound novel for this purpose. In a further aspect it relates to a vinylpyridine rubber composition having a decreased tendency to scorch.

The copolymerization of vinylpyridines with diolefinic compounds is known in the art. Although synthetic rubbers obtained by the copolymerization of vinylpyridines with diolefinic compounds and the incorporation into the rubbers of conventional vulcanization accelerators have many desirable characteristics, they also have the disadvantage of exhibiting a high tendency to scorch or a tendency to scorch in a very short time, as compared with other types of synthetic rubber compounds. The tendency of such vinylpyridine rubber mixtures to scorch is one of the more serious problems connected with the use of vinylpyridine rubbers. Failure in the prior art to provide a solution for the scorch problem has hindered to some extent the acceptance of this type of synthetic rubber by the industry.

The problem of scorch in the preparation of synthetic and natural rubbers is known in the art. Thus when a rubbery copolymer has been compounded with the necessary additives, it is necessary that the rubber mix remain in an unvulcanized state during all the milling, storing and other processing steps prior to the vulcanization step. In other words, it is desirable that the rubber shall not vulcanize or assume a non-plastic state within a sufficiently long period of time to allow for the proper milling or working of the rubber. Premature vulcanization changes the properties of the rubber product and renders it worthless for most uses. Those rubber mixes which have an undesirably high tendency to vulcanize prematurely are said to have a high scorch tendency or a low scorch time.

There is available on the market a great variety of chemical compounds and mixtures commercially used as additives for rubbers. Certain of these compounds are useful as vulcanization accelerators, others are effective as scorch retarders, others as anti-oxidants, others as anti-bloom agents, and still others as softeners, and yet others as fillers. In addition to the foregoing properties which are desirable in rubber, it is necessary that the rubber also have good physical characteristics such as high tensile strength, high resistance to abrasion and low heat buildup. Methods used to obtain the desired characteristics of rubbers are largely empirical and the effects of adding a given compound to a given rubber are largely unpredictable. Thus, an additive which imparts high oxidation resistance may have a deleterious effect on one or more of the other properties mentioned. Therefore, it is necessary in selecting a rubber additive for a given purpose to determine that the additive will not have a deleterious effect on some other property of the rubber.

Several of the vulcanization accelerators available on the market, when used in vinylpyridine rubbers, give compositions which will cure rapidly, but these vulcanization accelerators are not satisfactory because the compositions have a high tendency to scorch, i. e., a low scorch time.

This invention makes available to the art a vinylpyridine rubber composition and a group of compounds, novel as additives for vinylpyridine rubber, which provide satisfactory acceleration of vulcanization and yet do not cause scorching.

According to this invention there is provided a method of accelerating the vulcanization of a vinylpyridine rubber, without prematurely vulcanizing or scorching the mix, by the incorporation into said rubber, prior to milling, of an alkyl substituted sulfenyl dithiocarbamate.

Further according to this invention, there is provided a millable vinylpyridine rubber mix containing a small amount, sufficient to accelerate vulcanization without causing premature vulcanization, of an alkyl substituted sulfenyl dithiocarbamate.

Further according to this invention, there is provided a novel vinylpyridine rubber prepared by incorporation into the rubber mix an alkyl substituted sulfenyl dithiocarbamate, milling the rubber mix, and vulcanizing.

The vulcanization accelerators according to this invention are alkyl sulfenyl dithiocarbamates having the formula

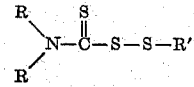

wherein each R is selected from the group consisting of hydrogen, hydrocarbon radicals, and radicals which together with the nitrogen form a heterocyclic ring, but with not more than one R being hydrogen, and R' is an alkyl radical. Preferably the total number of carbon atoms in the combined R groups is not more than 20 and that in R' is not more than 16. Typical of these compounds are N,N-dimethyl-S-tertiary-butyl sulfenyl dithiocarbamate, N,N(pentamethylene)-S-tertiary-butyl sulfenyl dithiocarbamate, and N,N(3-oxapentamethylene)-S-tertiary-butyl sulfenyl dithiocarbamate. Other alkyl sulfenyl dithiocarbamates of interest are those containing a branched thioalkyl group such as -S-isopropyl, -S-tertiary-amyl, -S-tertiary-heptyl, and -S-tertiary-dodecyl. Thus, also within the scope of this invention are N-methyl-N-ethyl-S-isopropyl sulfenyl dithiocarbamate, N,N-dodecyl-S-tert-hexadecyl sulfenyl dithiocarbamate, N-tert-butyl-N-tert-hexadecyl-S-tert-butyl sulfenyl dithiocarbamate, N,N-di(tert-butylcyclohexyl)-S-tert-butyl sulfenyl dithiocarbamate, N,N-di(diethylphenyl)-S-tert-butyl sulfenyl dithiocarbamate, and N,N-diethyl-S-tertiary-amyl sulfenyl dithiocarbamate. Other specific sulfenyl dithiocarbamates will be evident to those skilled in the art from the foregoing generic definition. These compounds and methods for preparing them are known in the art.

The sulfenyl dithiocarbamates of this invention are ordinarily incorporated into the rubber mix along with the other additives such as fillers, softeners, etc. Thus, a vinylpyridine copolymer is prepared according to copolymerization methods known in the art and the copolymer is recovered, e. g., by coagulation and separation of excess liquid. The copolymer is then mixed with the desired additives, including the additives of this invention, and subjected to the usual milling or working treatments. The mix thus obtained is then subjected to molding and vulcanization, as known in the art.

The proportion of alkyl sulfenyl dithiocarbamate vulcanization accelerator employed according to this invention depends upon the specific compounding recipe employed, the particular sulfenyl dithiocarbamate used, the extent and velocity of vulcanization desired, and other considerations which will be evident to those skilled in the art. In many instances, however, the amount added is substantially less than that ordinarily employed for conventional accelerators such as N-cyclohexyl-2-benzothiazolesulfenamide. In general, the amount of accelerator added according to this invention is in the range 0.05 to 5 parts by weight per 100 parts by weight of rubber and preferably in the range 0.1 to 2 parts per 100 parts by weight of rubber.

The vinylpyridine polymers in which the accelerators of this invention are incorporated are rubbery copolymers of a conjugated diene with a vinylpyridine compound. The vinylpyridine compounds employed can be represented by the formula

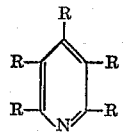

wherein R is selected from the group consisting of hydrogen, alkyl, vinyl, and alpha-methylvinyl (isopropenyl) groups, with at least one and not more than two of the groups being vinyl or alpha-methylvinyl, and the total number of carbon atoms in the alkyl groups being not greater than 12. The alkyl groups are preferably methyl and ethyl groups. Examples of such materials are: 2-vinylpyridine, 3-vinylpyridine, 4-vinylpyridine, 2-vinyl-5-ethylpyridine, 2,5-divinylpyridine, 2-methyl-5-vinylpyridine, 2,3,4,-trimethyl-5-vinylpyridine, 3-ethyl-5-vinylpyridine, 2-methyl-5-isopropenylpyridine, 2,4-dimethyl-5-isopropenylpyridine, 3-ethyl-5-isopropenylpyridine, 2-isopropenylpyridine, and 2-vinyl-3,5-diamylpyridine.

The conjugated dienes employed in the production of vinylpyridine copolymers are preferably those containing from 4 to 6 carbon atoms per molecule, e. g., 1,3-butadiene, isoprene, piperylene, methylpentadiene, 2,3-dimethyl-1,3-butadiene, and chloroprene. Conjugated dienes having more than 6, e. g., 8, carbon atoms per molecule can, however, be used when desired. Alkoxy derivatives, such as methoxybutadiene, ethoxybutadiene, etc., cyano derivatives of conjugated dienes, such as 2-cyanobutadiene, 2-methyl-3-cyanobutadiene, and the like can also be used.

In the preparation of a vinylpyridine copolymer, the proportion of conjugated diene to vinylpyridine compound is generally in the range from 50 to 98 parts by weight of conjugated diene to 50 to 2 parts by weight of the vinylpyridine compound.

*Example I*

A butadiene/2-methyl-5-vinylpyridine copolymer was prepared by emulsion polymerization at 5° C. in accordance with the following recipe:

| | Parts by weight |
|---|---|
| Water | 180 |
| Butadiene | 85 |
| 2-methyl-5-vinylpyridine | 15 |
| Fatty acid soap, K salt [1] | 5.0 |
| KCl | 0.2 |
| Daxad 11 [2] | 0.1 |
| $K_4P_2O_7$ | 0.165 |
| $FeSO_4 \cdot 7H_2O$ | 0.14 |
| Cumene hydroperoxide | 0.10 |
| Mercaptan blend [3] | 0.44 |

[1] Potassium Office Rubber Reserve soap.
[2] Sodium salt of condensed alkyl aryl sulfonic acid.
[3] A blend of tertiary $C_{12}$, $C_{14}$, and $C_{16}$ aliphatic mercaptans in a ratio of 3:1:1 parts by weight.

The polymer thus prepared was compounded in accordance with the following recipe:

| | Parts by weight |
|---|---|
| Elastomer | 100 |
| Philblack O [1] | 50 |
| Zinc oxide | 3 |
| Stearic acid | 1 |
| Flexamine [2] | 1 |
| Circosol-Paraflux blend [3] | 5 |
| Sulfur | 1.75 |
| Accelerator | Variable |

[1] High abrasion furnace black.
[2] A physical mixture containing 65 percent of a complex diaryl-amine-ketone reaction product and 35 percent of N,N'-diphenyl-p-phenylene-diamine.
[3] Circosol-2XH: Petroleum hydrocarbon softener, containing hydrocarbons of high molecular weight, in the form of a heavy, viscous, transparent, pale green, odorless liquid of low volatility; specific gravity, 0.940; Saybolt Universal viscosity at 100° F., about 2000 seconds. Paraflux: Saturated polymerized hydrocarbons.

The stocks were milled, cured 30 minutes at 307° F., and physical properties determined. Several runs were made using variable amounts of N,N-dimethyl-S-tertiary-butyl sulfenyl dithiocarbamate. One run was made for comparative purposes using 0.8 part N-cyclohexyl-2-benzothiazolesulfenamide, a commercially available accelerator. Results of the tests are shown below:

| Accelerator according to this invention,[1] PHR[2] | Commercial accelerator, PHR[2] | 80° F. | | | 200° F., tensile, p. s. i. | ΔT° F. | Resilience, percent | Compression set, percent | Scorch at 250° F. | |
|---|---|---|---|---|---|---|---|---|---|---|
| | | 300% modulus, p. s. i. | Tensile, p. s. i. | Elongation, percent | | | | | Minimum Mooney | Min. to scorch |
| 0.30 | ---- | 960 | 2,430 | 520 | 1,080 | 85.0 | 60.8 | 22.4 | 39 | 24.5 |
| 0.50 | ---- | 1,120 | 2,860 | 550 | 1,280 | 82.8 | 61.4 | 16.4 | 39 | 25.5 |
| 0.70 | ---- | 1,170 | 2,940 | 555 | 1,320 | 77.4 | 62.1 | 12.9 | 39 | 27.0 |
| ---- | 0.80 | 1,030 | 2,500 | 520 | 1,200 | 87.2 | 59.9 | 17.0 | 44 | 14.5 |

OVEN AGED 24 HOURS AT 212° F.

| 0.30 | ---- | 1,560 | 2,360 | 410 | ---- | 71.9 | 64.7 | ---- | ---- | ---- |
| 0.50 | ---- | 1,680 | 2,720 | 440 | ---- | 69.3 | 65.2 | ---- | ---- | ---- |
| 0.70 | ---- | 1,840 | 2,860 | 420 | ---- | 70.3 | 65.8 | ---- | ---- | ---- |
| ---- | 0.80 | 1,650 | 2,260 | 380 | ---- | 80.4 | 63.2 | ---- | ---- | ---- |

[1] N,N-dimethyl-S-tertiary-butyl sulfenyl dithiocarbamate.
[2] Parts per 100 parts rubber.

These results show a marked improvement in scorch over the commercial vulcanization accelerator when N,N-dimethyl-S-tertiary-butyl sulfenyl dithiocarbamate is used. This compound is shown to be a much more powerful accelerator than the commercial accelerator, approximately 0.5 part giving a rate of cure equivalent to that obtained with 0.8 part of the commercial accelerator. In addition to giving better scorch characteristics, the claimed vulcanization accelerator imparted better stress-strain properties, better resilience, and lower heat build-up.

Example II

A study was made to test the effect of different quantities of different accelerators, according to this invention, in an 85/15 butadiene/2-methyl-5-vinylpyridine rubber prepared by emulsion polymerization at 5° C. (41° F.) and having a Mooney value (ML–4) of 27. The accelerators, together with their formulas are listed below:

(1) N,N-dimethyl-S-tert-butylsulfenyl dithiocarbamate

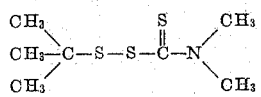

(2) Piperidine-S-tert-butylsulfenyl dithiocarbamate

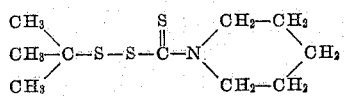

The basic compounding recipe was as follows:

| | Parts by weight |
|---|---|
| Butadiene/2-methyl-5-vinylpyridine elastomer | 100 |
| Carbon black (Philblack O) | 50 |
| Zinc oxide | 3 |
| Stearic acid | 1 |
| Flexamine [1] | 1 |
| Circo-Para [2] | 5 |
| Sulfur | 1.75 |
| Accelerator | Variable |

[1] Physical mixture containing 65 percent of a complex diarylamine-ketone reaction product and 35 percent of N,N'-diphenyl-p-phenylene-diamine.

[2] A blend of equal parts of Circosol–2XH with Paraflux.

The stocks were milled, cured 30 minutes at 307° F., and physical properties determined. The following results were obtained:

| Accelerator No. | PHR [1] | 80° F. | | | 80° F. Oven aged 24 hrs. at 212° F. | | | ΔT° F. | Resilience, percent | 212° F. compression set, percent | Compounded MS-1½ at 212° F. | Scorch at 250° F. | | Scorch at 280° F. | |
|---|---|---|---|---|---|---|---|---|---|---|---|---|---|---|---|
| | | 300% modulus, p. s. i. | Tensile, p. s. i. | Percent elongation | 300% modulus, p. s. i. | Tensile, p. s. i. | Elongation | | | | | Minimum Mooney | Minutes to scorch | Minimum Mooney | Minutes to scorch |
| 1 | 0.50 | 1,520 | 2,290 | 400 | 2,130 | 2,465 | 330 | 80.7 | 61.5 | 17.6 | 34.5 | 40 | 33 | 39 | 14 |
| 1 | 0.75 | 1,640 | 2,740 | 420 | 2,380 | 2,570 | 310 | 77.1 | 59.7 | 12.2 | 34 | 40.5 | 33 | 39 | 13.8 |
| 2 | 0.50 | 1,480 | 2,190 | 400 | 2,160 | 2,590 | 350 | 83.7 | 58.4 | 25.0 | 34.5 | 39.5 | 39.5 | 38 | 16.3 |
| 2 | 0.75 | 1,530 | 2,270 | 400 | 2,310 | 2,310 | 300 | 78.4 | 59.3 | 18.0 | 35 | 39.5 | 38 | 37.5 | 15.8 |
| 2 | 1.00 | 1,540 | 2,340 | 400 | 2,370 | 2,610 | 325 | 77.7 | 59.4 | 16.1 | 33 | 38 | 37.5 | 36 | 16.5 |
| 3 | 0.50 | 1,340 | 1,860 | 380 | 2,100 | 2,100 | 300 | 88.4 | 57.4 | 29.1 | 37.5 | 44 | 17 | 43 | 8.8 |
| 3 | 1.00 | | 1,490 | 285 | | 1,740 | 250 | 77.7 | 59.9 | 14.2 | 37 | 44 | 14 | 43 | 6.5 |
| 4 | 0.75 | 1,100 | 1,720 | 415 | 1,830 | 2,170 | 340 | 114.0 | 53.6 | 18.2 | 34 | 42 | 10.5 | 40 | 5.4 |
| 4 | 1.25 | 1,260 | 2,130 | 435 | 1,845 | 2,380 | 355 | 96.8 | 54.9 | 16.4 | 34.5 | 44 | 6.7 | 41.5 | 3.9 |
| 5 | 0.20 | 1,500 | 2,190 | 395 | 2,060 | 2,330 | 330 | 78.0 | 58.8 | 17.7 | 35 | 44 | 12.5 | 43 | 6.3 |
| 5 | 0.50 | 2,220 | 2,780 | 355 | 2,710 | 2,710 | 300 | 67.2 | 62.8 | 6.8 | 38 | 46 | 12 | 45 | 5.7 |
| 5 | 0.75 | 2,440 | 2,460 | 305 | | 2,150 | 235 | 61.2 | 66.2 | 5.1 | 37 | 45 | 11.3 | 44 | 5.8 |
| 6 | 0.20 | 1,310 | 1,880 | 390 | 1,990 | 2,220 | 330 | 87.6 | 57.8 | 23.0 | 41.5 | 50.5 | 9 | 49 | 4.8 |
| 6 | 0.50 | 1,890 | 2,360 | 350 | 2,460 | 2,460 | 300 | 70.6 | 62.5 | 8.4 | 41.5 | 54.5 | 4.5 | 55 | 2.6 |
| 6 | 0.75 | 2,230 | 2,560 | 330 | | 2,260 | 250 | 66.9 | 64.2 | 5.7 | 41.5 | 56 | 4 | 57.5 | 2.2 |
| 7 | 0.75 | 1,390 | 1,760 | 360 | | 1,940 | 290 | 91.8 | 56.3 | 17.3 | 39.5 | 44.5 | 15.3 | 43.5 | 7 |
| 7 | 1.00 | 1,530 | 2,050 | 365 | 2,170 | 2,170 | 300 | 78.7 | 59.1 | 14.8 | 39 | 44 | 13.8 | 43 | 6.8 |

[1] Parts per 100 parts rubber.

(3) Piperidine derivative of tert-butylthiosulfenyl dithiocarbamate

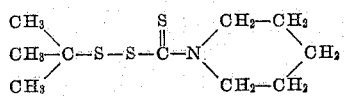

(4) Captax (mercaptobenzothiazole)

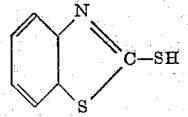

(5) Tuads (tetramethylthiuram disulfide)

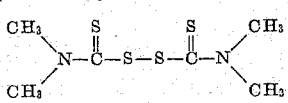

(6) Methyl zimate (zinc dimethyldithiocarbamate)

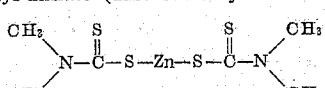

(7) Santocure (N-cyclohexyl-2-benzothiazolesulfenamide)

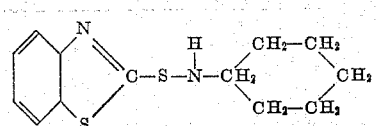

The foregoing data show that the vulcanization accelerators of this invention imparted to the vinylpyridine rubber mix a desirably high scorch time, i. e., around 13 to 17 minutes at 280° F., and a correspondingly longer time at 250° F., while other accelerators caused the rubber mix to scorch in a much shorter time, i. e., around 2 to 9 minutes at 280° F. In addition, the other properties of the rubber such as heat build-up, resilience, tensile strength, etc., were quite satisfactory. The vinylpyridine rubber is rendered satisfactory for commercial purposes through the use of the vulcanization accelerators of this invention.

The term "alkyl" as used herein signifies a monovalent organic radical consisting of carbon and hydrogen atoms arranged in configurations known to the art. The alkyl sulfenyl dithiocarbamates, according to this invention, can also be used as additives for natural rubber and for synthetic rubbers other than vinylpyridine rubbers.

Variation and modification are possible within the scope of the foregoing disclosure and the claims to this invention, the essence of which is that the scorch and vulcanization acceleration characteristics of a vinylpyridine rubber can be improved by the incorporation into said rubber of a small amount of an alkyl substituted sulfenyl dithiocarbamate and that a novel synthetic vinylpyridine rubber material having improved scorch characteristics has been provided.

I claim:

1. A composition of matter which is vulcanizable without scorch comprising a rubbery copolymer of a vinylpyridine and a conjugated diolefin hydrocarbon and from 0.05 to 5 parts by weight, per hundred parts by weight of said copolymer, of a compound represented by the formula

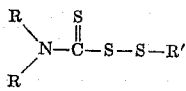

wherein R is selected from the group consisting of hydrogen, hydrocarbon radicals and radicals which together with nitrogen form a heterocyclic ring, not more than one R being hydrogen, R' is an alkyl radical containing not more than 16 carbon atoms, and the total number of carbon atoms in the combined R groups is not greater than 20.

2. A millable composition of matter which is vulcanizable without scorch comprising 100 parts by weight of a copolymer of from 50 to 98 parts by weight of a conjugated diolefin hydrocarbon and from 50 to 2 parts by weight of a vinylpyridine, and from 0.05 to 5 parts by weight of a compound having the formula

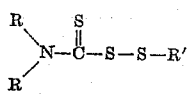

wherein R is selected from the group consisting of hydrogen, hydrocarbon radicals and radicals which together with nitrogen form a heterocyclic ring, not more than one R being hydrogen, R' is an alkyl radical containing not more than 16 carbon atoms, and the total number of carbon atoms in the combined R groups is not greater than 20.

3. In a method for producing a synthetic rubber which is vulcanizable without scorch, wherein a composition comprising a copolymer of from 50 to 98 parts by weight of a conjugated diolefin hydrocarbon and from 50 to 2 parts by weight of a vinylpyridine is subjected to milling and subsequent vulcanization, the improvement which comprises adding to said composition, during said milling, from 0.05 to 5 parts by weight, per 100 parts by weight of said copolymer, of a compound having the formula

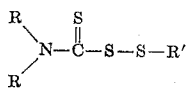

wherein R is selected from the group consisting of hydrogen, hydrocarbon radicals and radicals which together with nitrogen form a heterocyclic ring, not more than one R being hydrogen, R' is an alkyl radical containing not more than 16 carbon atoms, and the total number of carbon atoms in the combined R groups is not greater than 20.

4. A composition of matter which is vulcanizable without scorch comprising a rubbery copolymer of 2-methyl-5-vinylpyridine and butadiene and from 0.05 to 5 parts by weight per 100 parts by weight of said copolymer, of a compound represented by the formula

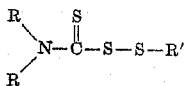

wherein R is selected from the group consisting of hydrogen, hydrocarbon radicals and radicals which together with nitrogen form a heterocyclic ring, not more than one R being hydrogen, R' is an alkyl radical containing not more than 16 carbon atoms, and the total number of carbon atoms in the combined R groups is not greater than 20.

5. A composition of matter according to claim 4 wherein said compound is N,N-dimethyl-S-tertiary-butyl sulfenyl dithiocarbamate.

6. A composition of matter according to claim 4 wherein said compound is N,N(pentamethylene)-S-tertiary butyl sulfenyl dithiocarbamate.

7. A vinylpyridine-diene rubbery copolymer having a scorch time in the range 13 to 17 minutes at 280° F. and containing from 0.05 to 5 parts by weight, per hundred parts by weight of said copolymer, of an alkyl sulfenyl dithiocarbamate.

8. In a method for producing a synthetic rubber which is vulcanizable without scorch wherein a composition comprising a copolymer of from 50 to 98 parts by weight of butadiene and 50 to 2 parts by weight of 2-methyl-5-vinyl pyridine is subjected to milling and subsequent vulcanization, the improvement which comprises adding to said composition, during said milling, from 0.05 to 5 parts by weight, per 100 parts by weight of said copolymer, of a compound having the formula

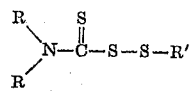

wherein R is selected from the group consisting of hydrogen, hydrocarbon radicals and radicals which together with nitrogen form a heterocyclic ring, not more than one R being hydrogen, R' is an alkyl radical containing not more than 16 carbon atoms, and the total number of carbon atoms in the combined R groups is not greater than 20.

9. The method of claim 8 wherein said compound is N,N-dimethyl-S-tertiary-butyl sulfenyl dithiocarbamate.

10. The method of claim 8 wherein said compound is N,N(pentamethylene)-S-tertiary-butyl sulfenyl dithiocarbamate.

11. The composition of claim 1 wherein said compound is N,N-dimethyl-S-tertiary-butyl sulfenyl dithiocarbamate.

12. The composition of claim 1 wherein said compound is N,N(pentamethylene)-S-tertiary-butyl sulfenyl dithiocarbamate.

13. The composition of claim 1 wherein said compound is N,N(3-oxapentamethylene)-S-tertiary-butyl sulfenyl dithiocarbamate.

14. The composition of claim 1 wherein said compound is N-methyl-N-ethyl-S-isopropyl sulfenyl dithiocarbamate.

15. The composition of claim 1 wherein said compound is N,N-diethyl-S-tertiary-amyl sulfenyl dithiocarbamate.

16. The method of claim 3 wherein said compound is N,N-dimethyl-S-tertiary-butyl sulfenyl dithiocarbamate.

17. The method of claim 3 wherein said compound is N,N(pentamethylene)-S-tertiary-butyl sulfenyl dithiocarbamate.

18. The method of claim 3 wherein said compound is N,N(3 - oxapentamethylene) - S - tertiary - butyl sulfenyl dithiocarbamate.

19. The method of claim 3 wherein said compound is N-methyl-N-ethyl-S-isopropyl sulfenyl dithiocarbamate.

20. The method of claim 2 wherein said compound is N,N-diethyl-S-tertiary-amyl sulfenyl dithiocarbamate.

References Cited in the file of this patent

UNITED STATES PATENTS

| | | |
|---|---|---|
| 2,024,613 | Tepema | Dec. 17, 1935 |
| 2,390,713 | Hunt | Dec. 11, 1945 |
| 2,570,632 | Barton | Oct. 9, 1951 |
| 2,586,769 | Himel et al. | Feb. 26, 1952 |